(12) United States Patent
Hill et al.

(10) Patent No.: US 8,406,919 B1
(45) Date of Patent: Mar. 26, 2013

(54) QUALITY REGULATING APPARATUS AND METHOD

(75) Inventors: Russel A. Hill, Waitsburg, WA (US); Rodney J. Fazzari, College Place, WA (US); Timothy Reardon, Walla Walla, WA (US)

(73) Assignee: Key Technology, Inc., Walla Walla, WA (US)

( * ) Notice: Subject to any disclaimer, the term of this patent is extended or adjusted under 35 U.S.C. 154(b) by 488 days.

(21) Appl. No.: 12/661,216

(22) Filed: Mar. 12, 2010

(51) Int. Cl.
*G06F 7/00* (2006.01)
*G05B 13/02* (2006.01)
*G05B 19/18* (2006.01)
*G03B 15/00* (2006.01)

(52) U.S. Cl. ............. 700/223; 700/28; 700/40; 700/29; 700/52; 700/55; 700/59; 399/42

(58) Field of Classification Search .................. None
See application file for complete search history.

(56) References Cited

U.S. PATENT DOCUMENTS

| 5,526,437 | A | 6/1996 | West |
| 5,887,073 | A * | 3/1999 | Fazzari et al. ................. 382/110 |
| 6,591,147 | B2 | 7/2003 | Nakane |
| 6,684,112 | B1 | 1/2004 | Cheng |

\* cited by examiner

*Primary Examiner* — Gene Crawford
*Assistant Examiner* — Yolanda Jones
(74) *Attorney, Agent, or Firm* — Paine Hamblen, LLP (57) ABSTRACT

A quality regulating apparatus and method is disclosed which operates on a product stream having an incoming product stream quality level so that an outgoing product stream quality level provided by the apparatus follows a target quality level so that it is better than the target quality level providing a maximum yield. The apparatus includes a conveying device, a product stream imager, an inspection engine, a routing engine, and an object diverting station. In operation, the inspection engine and routing engine cooperate in a manner so that objects classified as defective are intentionally passed to the output product stream when their inclusion maintains the quality level of the first output product stream at a level that is better than or equal to the target quality level.

14 Claims, 11 Drawing Sheets

QUALITY REGULATING APPARATUS AND METHOD

TECHNICAL FIELD

The present invention relates to sorting systems, and more specifically to sorting systems configured to operate on a product stream to deliver a quality level that is equal to or better than a target quality level.

BACKGROUND OF THE INVENTION

Maintaining consistent quality levels is important in the production and manufacturing of goods. Traditionally, quality levels are audited or graded by inspectors to ensure that products meet or exceed a target grade.

For example, in the production of French Fries, an inspector removes a sample from a production line and transports the sample to a lab. At the lab, the inspector examines each piece to determine if it is defective. For less desirable or defective pieces, the inspector classifies the piece by examining any less desirable aspects or defects that are present on the piece according to a pre-determined criterion. In this example, the less desirable or defective piece can be classified as a critical, major, or minor. The inspector scores the piece by assigning a value according to its defect classification, which in this case a value of three is assigned for critical defects, a value of two is assigned for major defects, and a value of one is assigned for minor defects. When all of the pieces have been inspected, the inspector adds the values together to determine the grade for the sample.

In many cases, the grade or quality measurement for the sample is recorded on a control chart and compared with the target grade or quality level or associated control limits to determine if any process parameters should be modified.

There are many process parameters available to operational personnel that affect the grade or quality level of a product stream. Many processors utilize machine vision sorting equipment to remove defective pieces from the product stream to meet grade. Often, an operator will, over the course of a shift of operation, modify parameters on the sorting equipment to respond to changing incoming product stream quality levels. For example, if raw product has a high incoming defect level, an operator may find it necessary to change parameters on the sorting equipment to more aggressively remove defective product. Often, an operator will modify a defect area size threshold, making it smaller for more aggressive removal of defects and larger for less aggressive removal. Such adjustments, though, are often based on latent information which may not reflect current quality conditions which may vary significantly over a short period of time.

State-of-the-art sorting equipment is effective in removing defects from incoming product streams even at high defect rates. In fact, sorting equipment is selected so that it is capable of providing a pass product stream having a grade that is better than the target grade in even worst case incoming product stream defect rates. The sorting equipment is often adjusted to attempt to remove all less desirable objects or defects, especially major and critical defects.

So, while a processor is able to keep the processing line grade below the target grade and better than the quality target, the overall yield of the processing line is not optimized because more defective or less desirable pieces as well as good pieces are removed which could have been passed while still meeting the quality goals of the processor and customer.

One example of a system designed to address at least a portion of this problem is an integrated food sorting and analysis apparatus is taught in U.S. Pat. No. 5,526,437 and incorporated by reference herein. Here, an upstream camera is positioned to view a product stream, and operable to drive a product diverter based on observed object characteristics and automated sorting logic. The apparatus also includes a downstream camera positioned to view the product stream after it has passed the product diverter. A data processor is responsive to both the upstream camera and the downstream camera to periodically examine samples of food objects and to calculate upstream and downstream quality statistics. In addition, the data processor also calculates settings for the automated sorting logic based upon the calculated quality statistics. While notable in its innovation, the apparatus described above suffers from a number of problems including the requirement of a downstream camera which significantly increases the complexity and cost of the system making it unfeasible in many situations. In addition, the information gleaned by the downstream camera from a batch sample of food objects does not necessarily reflect the objects that are currently being processed by the upstream camera making any subsequent adjustment prone to error that is a function of a real-time, time-varying, and non-homogenous quality distribution for objects in the product stream.

What is needed then is a machine that is effective in maintaining a quality level of a pass or output product stream at a quality level that follows and is slightly better than the target quality level, thereby maximizing yield.

SUMMARY OF THE INVENTION

One aspect of the invention is a quality regulating apparatus configured to transform an incoming product stream of objects having an incoming quality level into a first output product stream having an outgoing quality level that follows a target quality level, and a second output product stream, including a conveying device configured in transporting relation to the incoming product stream, a product stream sensor coupled to the incoming product stream as it is transported by the conveying device, an inspection engine connected to the product stream sensor and operable to categorize each object according to a criteria, and wherein objects are classified as desirable or as less desirable, a routing engine connected to the inspection engine, an object diverting station connected to the routing engine, and wherein the inspection engine and routing engine cooperate in a manner so that objects classified as less desirable are intentionally routed to the first output product stream when their inclusion maintains the outgoing quality level of the first output product stream at a level that is better than or equal to the target quality level.

Another aspect of the invention is a quality regulating apparatus configured to transform an incoming product stream of objects into a first output product stream having a quality level approaching a target quality level and a second output product stream, including, a conveying device configured in transporting relation to the incoming product stream, a first product stream imager coupled to the incoming product stream as it is transported by the conveying device, a second product stream sensor coupled to the incoming product stream as it is transported by the conveying device, an inspection engine connected to each of the first and second product stream imagers, and operable to categorize each object from each imager according to a defect criteria, and further operable to register each object from each imager in order to classify each actual object as good or as defective, a routing engine connected to the inspection engine, an object diverting station connected to the routing engine, and wherein the inspection engine and routing engine cooperate in a manner so that objects classified as defective are intentionally routed to the first output product stream when their inclusion maintains the quality level of the first output product stream at a level that is better than or equal to the target quality level.

Yet another aspect of the present invention is a quality regulating method operable to transform an incoming product stream of objects into a first output product stream having a quality level approaching a target quality level and a second output product stream, including scanning objects in the incoming product stream, classifying each object as a good object or a defective object, providing a second output product stream routing tag for defective objects, maintaining a collection of recent objects in an object table, computing a provisional quality level based on objects listed in the object table and on a current defective object by assuming that the current defect object is routed to the first output product stream, removing the second output product stream routing tag for the current defective object if the computed provisional quality level is better than or equal to the target quality level.

Another aspect of the present invention is a quality regulating method operable to transform an incoming product stream of objects into a first output product stream having a quality level approaching a target quality level and a second output product stream, including inspecting objects from the incoming product stream to provide inspection results, estimating the quality level of the first output stream for a sample of objects, evaluating the objects based on the inspection results and the quality level to provide a routing decision, routing objects according to the routing decision, and wherein objects are evaluated and assigned a routing decision that urge them into the first output product stream when their inclusion would maintain the quality level so that it is maintained at a level that is equal to or better than the target quality level.

These and other aspects of the present invention will be described in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
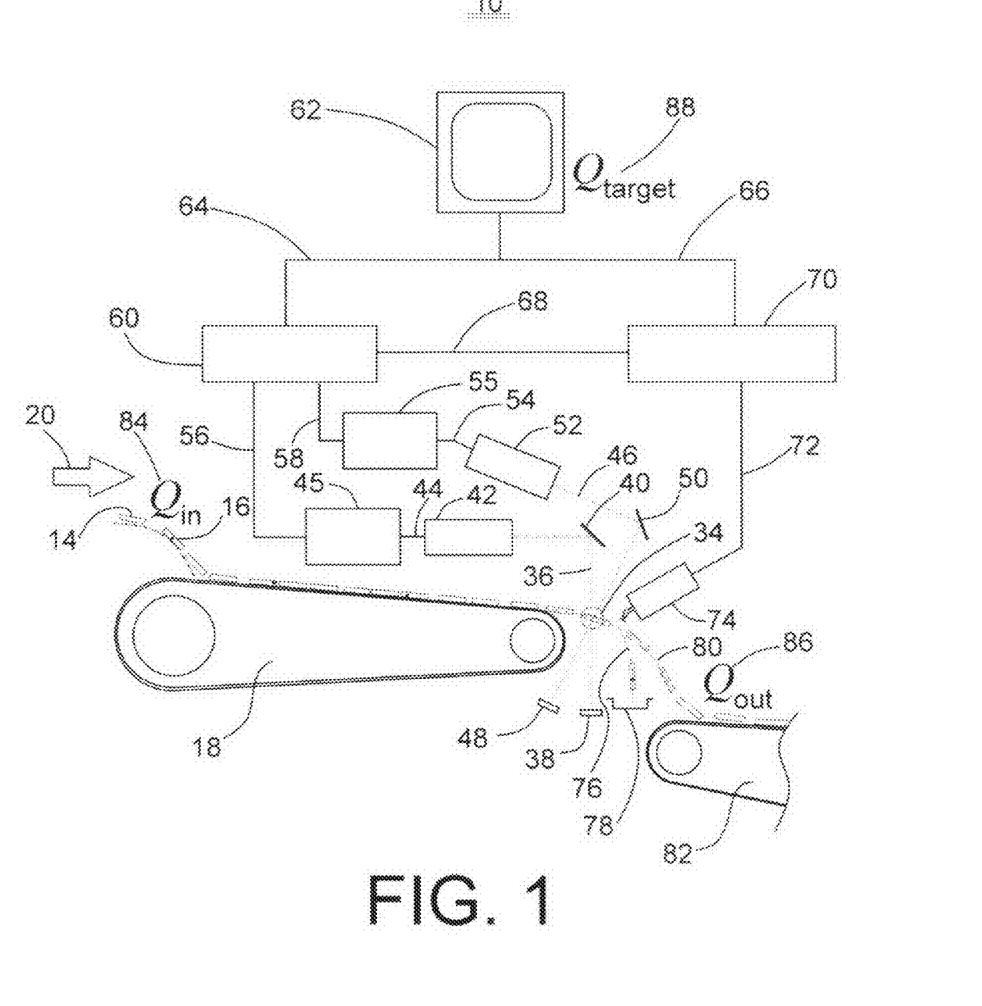
FIG. 1 is a simplified block diagram of a quality regulating apparatus.

Referring to FIG. 1, a quality regulating apparatus 10 is shown in processing relation to an incoming product stream 12. The incoming product stream 12 is composed of articles or objects that have been grown, manufactured or processed and can include either packaged or unpackaged articles. In the production of such objects, there are often a mixture of good or desirable objects 14 and defective or less desirable objects 16. Such objects are transported as an incoming product stream 12 on a presentation conveyor 18 in a product flow direction 20.

Figure 2:
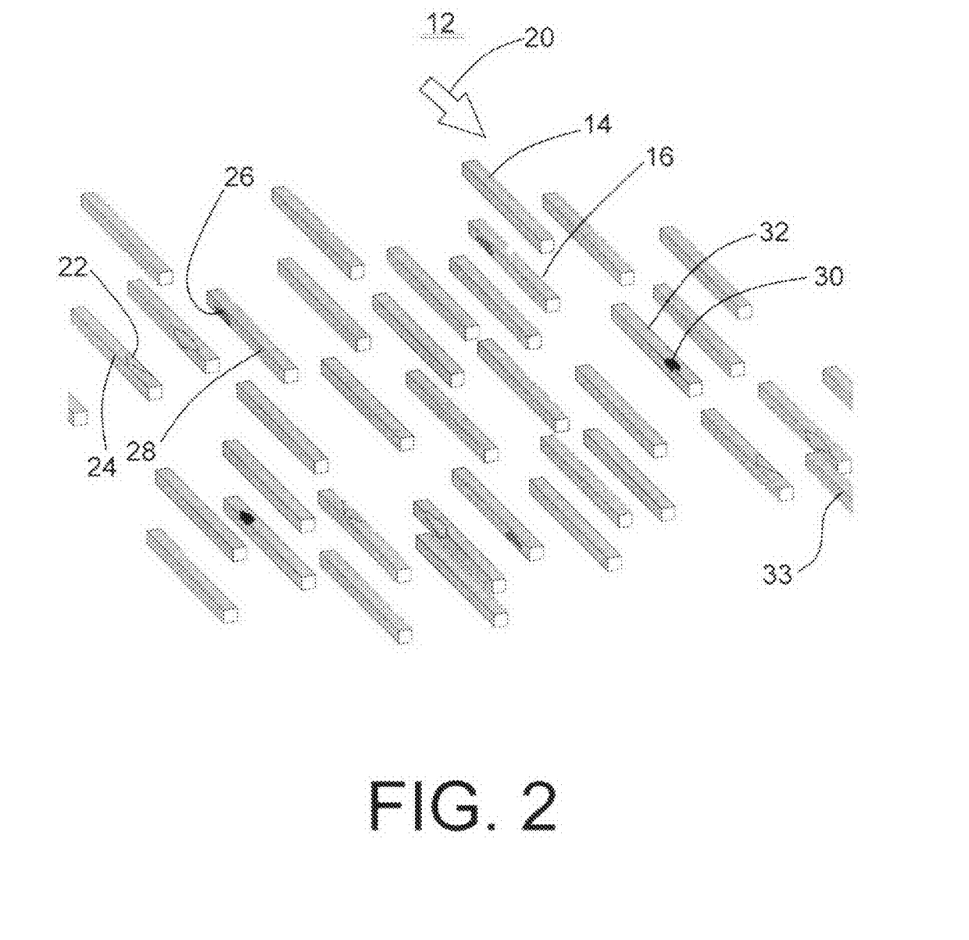
FIG. 2 is an perspective view of an incoming product stream including a plurality of elongated objects.

Referring now to FIG. 2, a plurality of elongated articles, such as potato strips, are illustrated as they are conveyed on the presentation conveyor 18 traveling in the flow direction 20. Ideally, the potato strips are transported by the presentation conveyor 18 in a stabilized and singulated manner as generally shown in FIG. 2. As noted above, in the incoming product stream 12 there are a mixture of desirable or good objects 14 and undesirable or defective objects 16. The defective objects 16 are often further categorized into sub-categories to more accurately depict their condition. In one application, defective objects 16 having a minor defect 22 are designated as minors or minor objects 24; defective objects 16 having a major defect 26 are designated as majors or major objects 28; and defective objects 16 having a critical defect 30 are designated as criticals or critical objects 32. In addition, objects that are presented in an unsigulated manner are referred to as clustered or clumped and are generally designated by the numeral 33 in FIG. 2.

Referring again to FIG. 1, the incoming product stream 12 is transported and accelerated by the presentation conveyor 18 so that objects are delivered through a line of sight 34 where they are optically interrogated to ascertain their condition. Objects traveling through the line of sight 34 reflect or transmit light or electromagnetic radiation along a first optical path 36. In addition, a first background 38 interacts with the first optical path 36 and is useful to provide a contrasting color for image processing operations which will be discussed in further detail below. The first optical path 36 further interacts with, and is guided by, a first mirror 40 whose function is to direct the path to a first sensor or imager 42 configured to convert the light or electromagnetic scene impinging on its sensor into a time or index ordered first image data signal 44. A first image processor 45 is connected in data receiving relation to the first image data signal 44 to provide grouping and filtering operations to organize the image data signal 44 into individual objects.

Similarly, objects traveling through the line of sight 34 reflect or transmit light or electromagnetic radiation along a second optical path 46. In addition, a second background 48 interacts with the second optical path 46 and is useful to provide a contrasting color for image processing operations which will be discussed in further detail below. The second optical path 46 further interacts with, and is guided by, a second mirror 50 whose function is to direct the path to a second sensor or imager 52 is configured to convert the light or electromagnetic scene impinging on its sensor into a time or index ordered second image data signal 54. A second image processor 55 is connected in data receiving relation to the second image data signal 54 to provide grouping and filtering operations to organize the image data signal 54 into individual objects.

Object data generated by the first image processor 45 and the second image processor 55 are each is routed along a first object data path 56 and a second object data path 58 respectively to an inspection engine 60. The inspection engine 60 is configured to process the object data according to classification criteria 64 that is provided via a graphical user interface 62. This classification criteria includes defect color boundary definitions and defect size thresholds, so that a determination is made to tag an object according to the needs of the application. For example, the inspection engine 60 is operable to tag each article from each optical path as a good object 14, a minor object 24, a major object 28, or a critical object 32. In addition, the inspection engine 60 is equipped to identify clumped objects 33 having minor defects 24 or major defects 26 or critical defects 30. Yet further, the inspection engine 60 is equipped with algorithms to estimate various object parameters including the viewed area of the object. This information is provided as classified object data and follows the path generally designated by the numeral 68.

Figure 3:
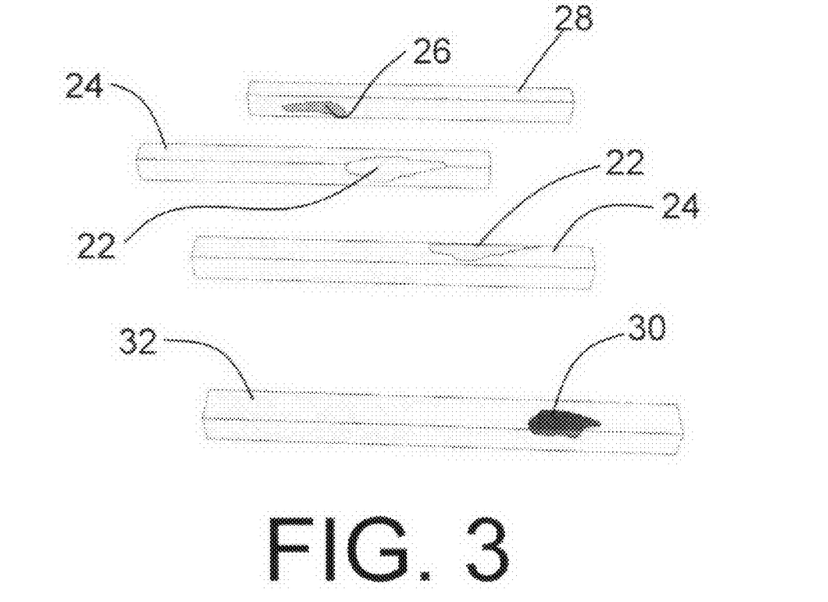
FIG. 3 is a perspective view of four elongated objects from a first view angle.
Figure 4:
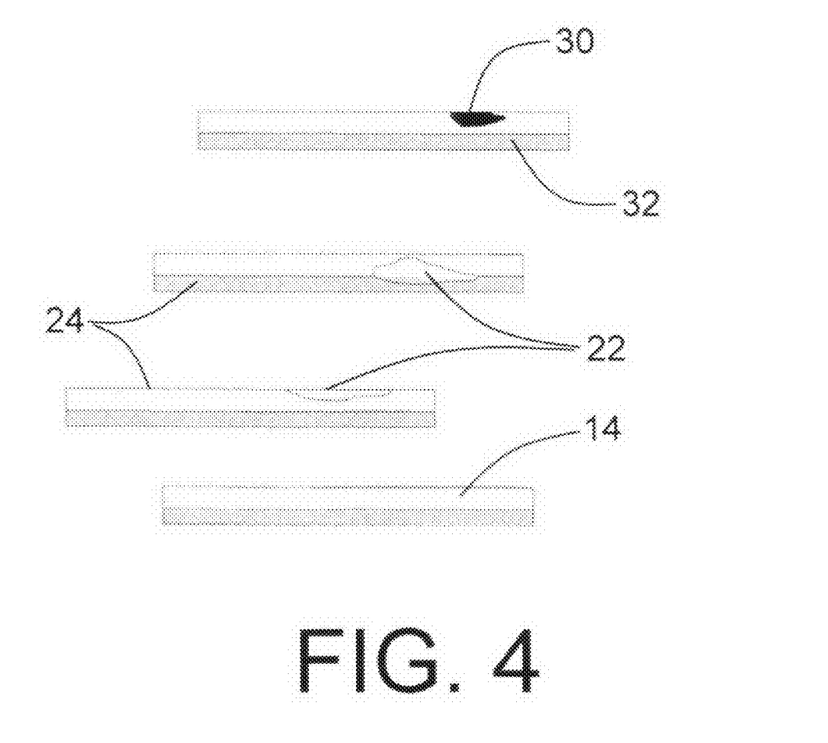
FIG. 4 is a perspective view of four elongated objects from a second view angle.

The classified object data from each object and view following the path 68 is directed to a routing engine 70. Referring now to FIGS. 1, 3 and 4, the routing engine 70 is equipped to correlate objects between individual views from different perspectives. For example, FIG. 3 shows a set of four objects from a first view depicted by the first optical path 36, and FIG. 4 shows the same set of four objects from a second view depicted by the second optical path 46. A careful inspection of each figure illustrates that one of the objects is classified differently between FIG. 3 and FIG. 4 because the major defect 26 shown in FIG. 3 is hidden from view in FIG. 4. Thus, the major object 28 in FIG. 3 is misclassified as a good object 14 in FIG. 4. Thankfully, by correlating and arbitrating the objects among the views, the routing engine 70 is equipped to recognize this discrepancy by geometrically and spatially correlating the objects into a common Cartesian space where their defect attributes can be logically OR'ed to properly classify the objects.

Referring again to FIG. 1, the graphical user interface 62 is useful to provide a set of user defined routing and grading criteria that is routed via the path 66 to the routing engine 70. This criteria is operable to control the behavior of the routing engine 70 and will be discussed in further detail below. The routing engine 70 is equipped with a virtual rotating drum to provide proper timing for a plurality of ejection signals 72 that are connected to an ejector bank 74 or object diverting station so that accurate fluid pulses can be applied to individual objects targeted for removal and routing to a reject stream 76 as they translate proximate to a designated ejector nozzle where the object is finally deposited in a reject conveyor 78 where they are routed for further process or disposal. Articles that are not tagged for rejection are allowed to pass without incident in a pass stream 80 where they are received by a pass stream conveyor 82 for transport to further processing.

The incoming product stream 12 has an incoming quality level or grade that is generally designated by the numeral 84. This quality level is constantly in flux, following natural process variation as well as assignable causes associated with a processing line and raw product variation. In one example, the quality level is a function of a count of defective objects for a given sample size. Other more elaborate quality level measuring schemes include a count of sum-products of specific defect types weighted by severity for a given sample size. For example in the production of French Fries, quality levels are ascertained by collecting a five pound sample and inspecting and classifying each fry according to its highest defect, wherein the defects include criticals or critical defects 32, majors or major defects 28, and minors or minor defects 24. Then, a total number of criticals 32 are multiplied by a defect weight of three, majors 28 are multiplied by a defect weight of two, and minors 24 are multiplied by a defect weight of one and the resulting sum is totaled to provide a quality score or grade. One skilled in the art would recognize that there are many ways of measuring quality, and these could be applied using the principles of this disclosure with success without departing from the scope of this invention.

The outgoing pass stream 80 has an outgoing quality level or grade that is generally designated by the numeral 86. State-of-the-art automatic sorting equipment is often operated in a manner where the outgoing quality level 86 is substantially better than incoming quality level 84 since state-of-the-art sorting equipment is unaware of, or unable to measure, a real-time incoming quality level 84. Such operation, though, is not always desirable, especially if the outgoing quality level 86 is substantially better than what is required by a customer.

An exemplary feature of the present invention is the inclusion of a target quality level 88 that is provided by a user from the graphical user interface 62. In situations where the incoming quality level 84 is better than the target quality level 88, the quality regulating apparatus 10 is instructed to only remove the most offensive defects and allow other defects that normally would be removed in a conventional automatic sorter to pass into the pass stream 80 thus maintaining the outgoing quality level 86 at a level that is better than the target quality level 88. In other situations where the incoming quality level 84 is worse than the target quality level 88, the quality regulating apparatus 10 is instructed to modify or act upon the incoming product stream 12 to provide a regulated outgoing quality level 86 that follows, and is only slightly better than or equal to the target quality level 88. In this manner, the outgoing quality level 86 of the pass stream 80 is maintained at a level equal to or better than the target quality level 88, while simultaneous minimizing the number of objects that are routed through the reject stream 76 to the reject conveyor 78 thereby providing a maximum yield contribution to the processor.

Figure 5:
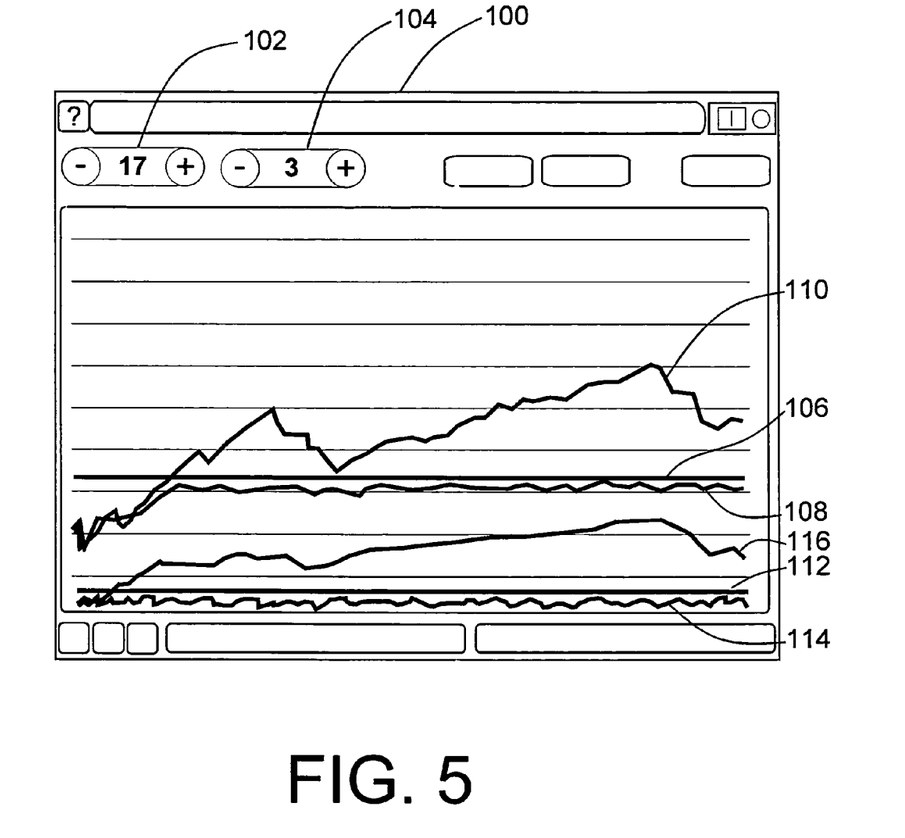
FIG. 5 is a screen shot of a graphical user interface for a sort to grade or quality regulating application.

Referring now to FIG. 5, the graphical user interface 62 is configured to provide a sort to grade screen 100 that enables a user to control the exemplary feature as described above. A careful inspection of FIG. 5 reveals a target grade display and adjustment 102 and is an indicator of the target quality level 88. The adjustment 102 can be increased to degrade the target quality level 88 or decreased to improve the target quality level 88. A second quality adjustment or target quality level that includes a majors allowed display and adjustment 104 designates a number of major objects or points 28 that are allowed to proceed into the pass stream 80.

A time ordered historical graph is provided in the space below the adjustment 104. Here, a target grade line is designated by the numeral 106 and is an indicator of the target quality level 88 and is drawn at a level selected by the adjustment 102. An estimated output grade trend line 108 is shown below, but approaching and then following the target grade line 106. The estimated output grade line 108 is an indicator of the outgoing quality level 86.

Similarly, a major target count line 112 is drawn at the level selected by the adjustment 104. An estimated output major count or points 114 trend line is drawn approaching, but not exceeding the major target count line 112. Line 110 represents an incoming grade level measured by the quality regulating apparatus 10. Line 116 represents a best or optimum grade that the quality regulating apparatus 10 is capable of, given its present configuration, if it was allowed to remove all defective or less desirable objects.

Figure 6:
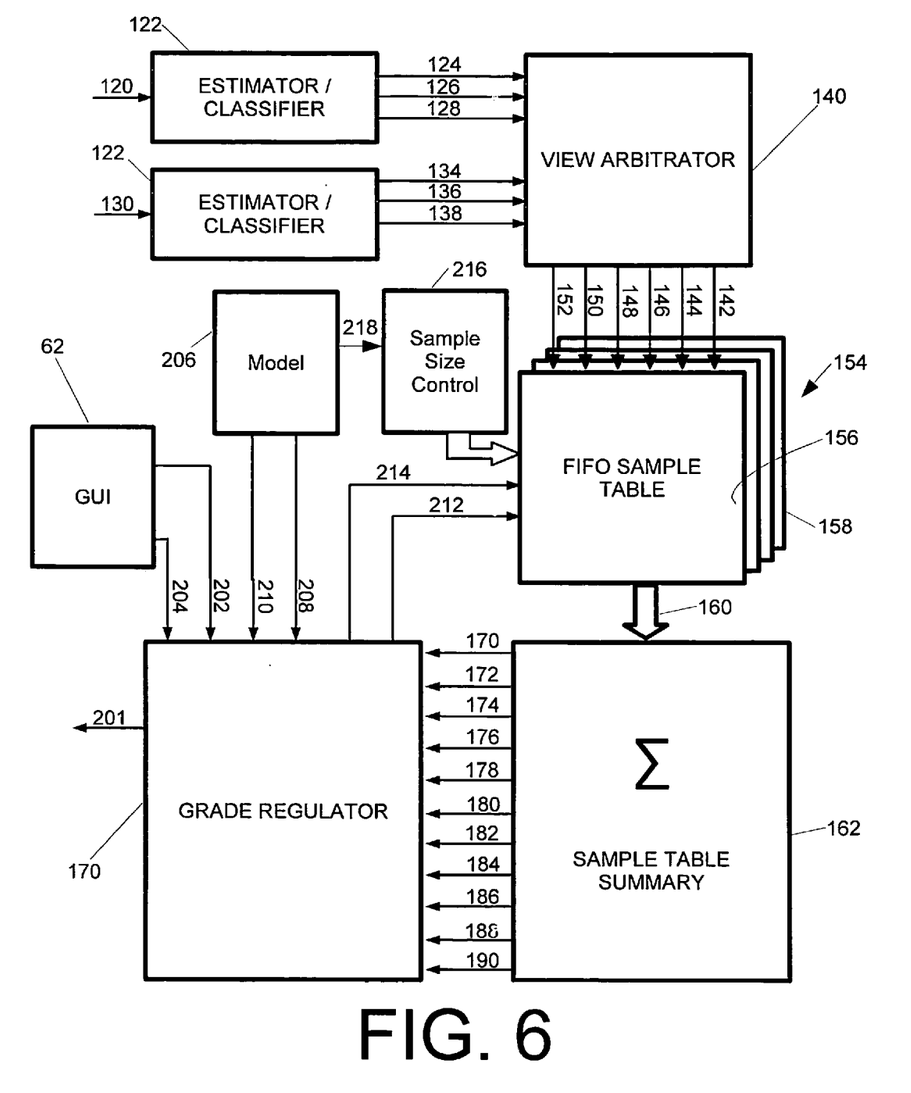
FIG. 6 is a process block and data flow diagram of information utilized in a sort to grade or quality regulating application.

Referring now to FIG. 6, object data from view one 120 is presented to the estimator and classifier process 122 that functions to measure a parameter, such as a viewed area for each object, classify the object according to its defect class, and determine if the object is a clump. The estimator and classifier process 122 provides object measured area 124, object classification 126, and object clumping flag 128 to a view arbitrator process 140 whose function will be described in further detail below.

Object data from view two 130 is presented to another estimator and classifier process 122 to provide object measured area 134, object classification 136, and an object clumping flag 138 for the second view to the view arbitrator process 140.

The view arbitrator process 140 receives data from each classifier and estimator 122 and is advantageous for reconciling and aligning data so that an object seen by each view can be correlated to accurately ascertain its classification and provide a realistic object area estimate for the entire incoming product stream 12 (FIG. 1). The view arbitrator process 140 provides object total area 142, object merge count 144, object clump flag 146, object minor count 148, object major count 150, and object critical count 152 information to a first-in-first-out object table or object sample table 154.

The object sample table 154 is a first-in-first-out table containing object-by-object records of the information provided by the view arbitrator process 140 and other processes to be described below. The object sample table 154 functions to provide a record of all objects in a current sample, and represents the most recent objects that have been viewed. The object sample table 154 includes a most recent, current or latest object record 156, and an oldest or earliest object record 158. The management of the objects in the object sample table 154 will be discussed in further detail below.

Data from the object sample table 156 are linked in data flow relation according to an arrow 160 to a sample table summary 162. The sample table summary 162 provides a summation of parameters of objects that are included in the object sample table 154. In a preferred embodiment, the sample table summary 162 is updated on an object-by-object basis, although one skilled in the art would recognize that the summary 162 could be provided by summing the fields from all of the records of the object sample table 154. In addition, one skilled in the art would recognize that the sample table could include information about a multitude of objects, where each entry is representative of a group of objects.

The sample table summary 162 provides a plethora of data concerning objects included in the object sample table 154 including: total incoming area 170, total passed area 172, total passed minor area 174, total passed major area 176, total good area 178, minors passed count 180, majors passed count 182, minors in clumps count 184, minor count 186, major count 188, and critical count 190. The total incoming area 170 is a sum of averages of the total area 142 divided by the merge count 144 for of all objects in the object sample table 154. The total passed area 172 represents the sum of all of the objects in the object sample table 154 that have been routed to the pass stream 80. The total passed minor area 174 represents an estimate of the area of objects included in the object table 154 that were classified as a minor object 24 (FIG. 2). The total major area 176 represents an estimate of the area of objects included in the object table 154 that were classified as a major object 28 (FIG. 2). The total good area 178 represents an estimate of the area of objects included in the object table 154 that were classified as a good object 14 (FIG. 2).

The number of objects that were classified as minor objects 24 that were intentionally allowed to be routed to the pass stream 80 (FIG. 1) that are included in the object sample table 154 is maintained as a minors passed count 180 value. The number of objects that were classified as major objects 28 that were intentionally allowed to be routed to the pass stream 80 (FIG. 1) that are included in the object sample table 154 is maintained as a majors passed count 182 value. A minors in clumps count 184 is retained that represents an actual count of minor defects 24 for clumped objects 33 (FIG. 2) for objects included in the object sample table 154.

A minor count 186 is provided that tracks a running total or count of the number of observed minor defects 22 (FIG. 2) included on objects in the object sample table 154. A major count 188 is provided that tracks a running total or count of the number of observed major defects 26 (FIG. 2) included on objects in the object sample table 154. A critical count 190 is provided that tracks a running total or count of the number of observed critical defects 30 (FIG. 2) included on objects in the object sample table 154.

Data provided by the sample table summary 162 process is utilized by a grade regulator process 200 that functions to inform the routing engine 70 in a manner so that the outgoing quality level 86 is maintained at a level that is slightly better than the target quality level 88 when the incoming quality level 84 is worse than the target quality level 88. The routing engine 70 is informed via a grade routing decision 201 which follows an earlier provided routing decision provided by the estimator and classification process, except when a reversal of this decision provides for a higher yield while still maintaining an outgoing quality level 86 that is better than the target quality level 88.

The grade regulator process 200 receives a target grade 202 value and an allowable major score 204 value from the graphical user interface 62.

A model 206 provides a set of parameters to the grade regulator process 200 that are specific to an application and to a specific model, type, or size of the quality regulating apparatus 10 (FIG. 1). The model 206 provides a set of severity points or weights 208 to the grade regulator 200 to enable it to provide an estimate of the grade or quality as depicted in the trend lines 108, 110, 114, and 116 of FIG. 5. In a preferred example, the severity points or weights 208 would include a set of constants having a value equal to three for objects classified as critical objects 30 (FIG. 2), a value of two for objects classified as major objects 28 (FIG. 2), and a value of one for objects classified as minor objects 24 (FIG. 2). For objects classified as clumped objects 33 (FIG. 2), the same set of constants are used but on a defect-by-defect basis.

The model 206 is also configured to provide a set of viewing efficiency factors 210 to the grade regulator process 200. These viewing efficiency factors 210 represent a probabilistic measure of the accuracy, or figure of merit, of the inspection engine's 60 ability to identify and correctly classify or tag a specific type of defect. The viewing efficiency factors 210 are determined empirically. The viewing efficiency factors 210 are applied to a calculation of a provisional grade to account for objects that were not accurately seen or classified to ensure that an accurate estimation of the outgoing quality level 86 is predicted, based on the empirical knowledge of past performance that is embedded into the model 206. In a preferred example, there is a specific value for each of the three types of defect classes including critical, major, and minor.

The model 206 also delivers a target sample size criteria 218 to a sample size control process 216 that is configured to maintain a set of most recent objects in the object table 154 whose total passed area 172 that approximates the target sample size criteria 218. As a new object is added in first-in-first-out relation to the object table 154 and assumes the current record 156 position, the sample size control process 216 acts to retire or remove the oldest included record 158 until the target sample size criteria 218 is met.

The grade regulator process 200 provides a has-passed-minor flag 212 to update the current object record 156 when a minor object is intentionally routed to the pass stream 80. The sample table summary 162 is also updated with this information to accurately reflect the contents of the object sample table 154. The grade regulator process 200 further provides for a has-passed-major flag 214 to update the current object record 156 when a major object is intentionally routed to the pass stream 80. The sample table summary 162 is also updated with this information to accurately reflect the contents of the object sample table 154.

It should be appreciated that the processes depicted in FIG. 6 can be implemented in various parts of the processing chain including the image processors 45 and 55 as well as the inspection engine 60 or the routing engine 70 or in any combination thereof. Further, the inspection engine 60 and routing engine 70 cooperate in a manner so that objects classified as defective are intentionally routed to the first output product stream 80 when their inclusion maintains the quality level 86 at a level that is better than or equal to the target quality level 88.

Referring now to FIGS. 7-12, a series of steps are taken during the running of the processes outlined in FIG. 6. The operation of these steps will be discussed in further detail below.

Operation

The operation of the present invention is believed to be readily apparent and is briefly summarized in the paragraphs which follow.

In operation, and referring to FIGS. 1-5 the quality regulating apparatus 10 includes the user interface 62 having the sort to grade screen 100 to enable an operator to manipulate the target grade display and adjustment 102 and the majors allowed display and adjustment 104 to specify the target quality level 88 desired for current operation. The target grade line 106 and the major target count line 112 are shown to graphically represent these values.

The incoming product stream 12 flowing in the direction 20 is delivered to the presentation conveyor 18. The incoming product stream 12 has an incoming quality level 84 and includes good objects 14, and defective or less than preferred objects 16. The objects in the product stream 12 are transported on the presentation conveyor 18 and directed through the line of sight 34.

Light or electromagnetic radiation reflected from or transmitted through the line of sight 34 follows the plurality of paths 36 and 46 arriving at the first and second imagers 42 and 52 respectively. Image data provided by the first and second imagers 42 and 52 is processed by the first and second image processors 45 and 55 where object based data is provided to the inspection engine 60.

Figure 7:
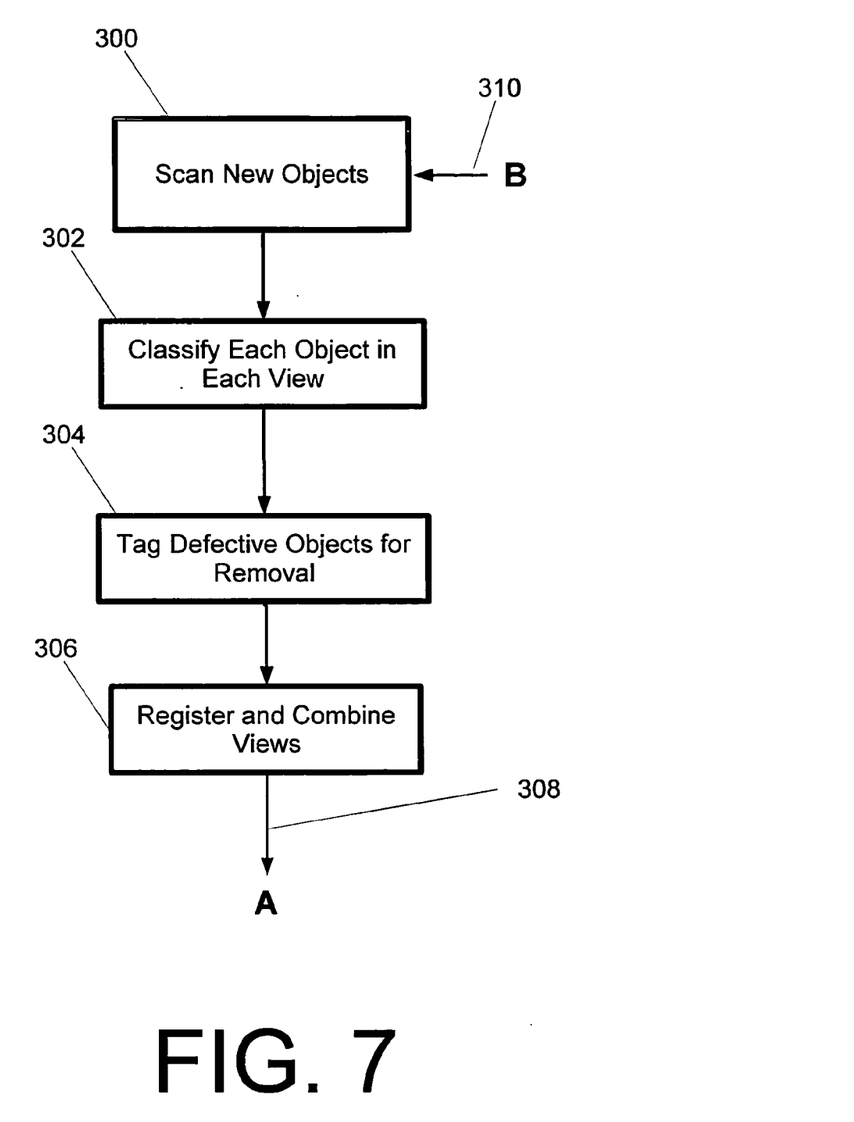
FIG. 7 is a simplified flow chart of a classification, tagging and registration operation.
Figure 8:
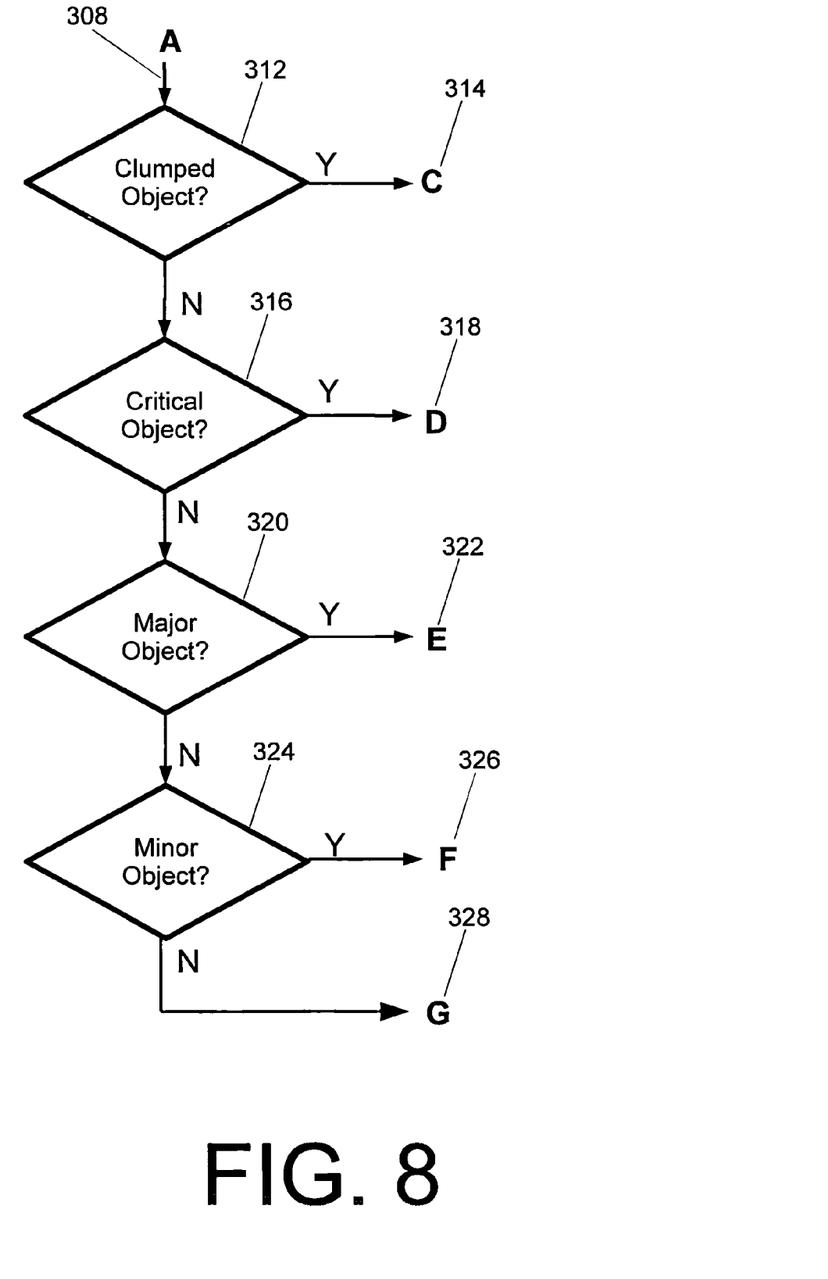
FIG. 8 is a simplified flow chart of a decision tree for logical routing based on a classification of an object type.
Figure 9:
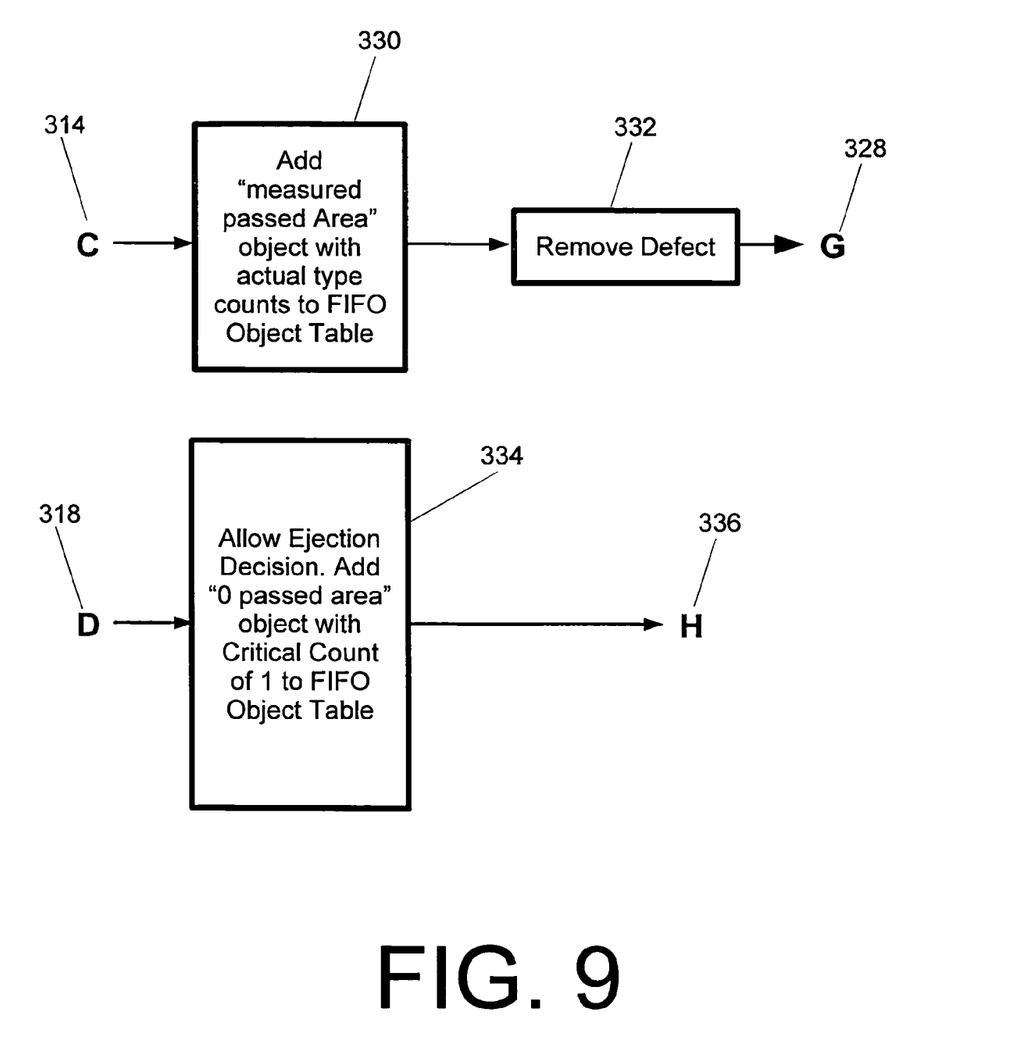
FIG. 9 is a simplified flow chart of steps followed for clumped and critical objects.

Referring now to FIGS. 1, 6 and 7, object based data from each view 120 and 130 is provided in step 300. Next, an object that has been completely viewed is classified in step 302 in the estimator and classifier process 122. If the object is classified as a defective object, its record is tagged for removal in the estimator and classifier process 122. The estimator and classifier process also provide object measured area 124, 134 data and the object clumping flag 128, 138 for each view.

The view arbitrator process 140 registers and combines views in step 306 as discussed earlier in this specification. Once complete the process continues with the connector A designated by the numeral 308 connected to a decision tree illustrated in FIG. 8. The clump decision step 312 follows the connector C to FIG. 9 for objects that are classified as clumped objects 33 (FIG. 2). Here, in step 330, the subject object is inserted as the current object record 156 in the object sample table 154 and the total area of the object is stored in the measured passed area field and along with the defect counts. Next, the defect is targeted for removal in step 332. The connector G is indicated by the numeral 328 and guides us to FIG. 12, where the oldest included object record 158 is discarded to maintain a constant total passed area within a tolerance as maintained by the sample size control process 216 based on the sample size criteria 281 provided by the model 206. During this process it is sometime necessary to discard multiple objects in order to satisfy the sample size criteria 281. Next, in step 356 the values in the sample table summary 162 are adjusted to reflect the current contents of the object sample table 154. Following connector B 310 returns the process to step 300 in FIG. 7 where new objects are scanned and the process continues.

Referring again to FIG. 8, if the current object is not a clumped object as ascertained in step 312, then the current object is checked to see if it is a critical object in step 316. If it is a critical object 32 (FIG. 2), then following connector D designated by the numeral 318 transfers flow to FIG. 9 where in step 334, the ejection decision provided by view arbitrator process 140 is allowed to stand, and the current object is placed into the object sample table 154 in the current record 156 position as a zero passed area object with a critical defect count of one. Following connector H designated by the number 336 directs us to step 356 where the values in the sample table summary 162 are adjusted to reflect the current contents of the object sample table 154. Following connector B 310 returns the process to step 300 in FIG. 7 where new objects are scanned and the process continues.

Referring again to FIG. 8, if the current object is not a critical object as ascertained in step 316, then the current object is checked to see if it is a major object in step 320. If it is a major object 28 (FIG. 2), then following connector E designated by the numeral 322 forwards control to FIG. 10 where step 338 is taken that includes the task of computing a provisional major grade in the grading regulator 200. The provisional major grade is the sum of majors passed count 182 from the sample table summary 162 plus one, representing the current object, plus a product of the viewing efficiency factor 210 for major objects provided by the model 206 and the major count 188 from sample table summary 162. Then, in step 340, the provisional major grade value provided by step 338 is compared to the allowable major score 204.

Figure 10:
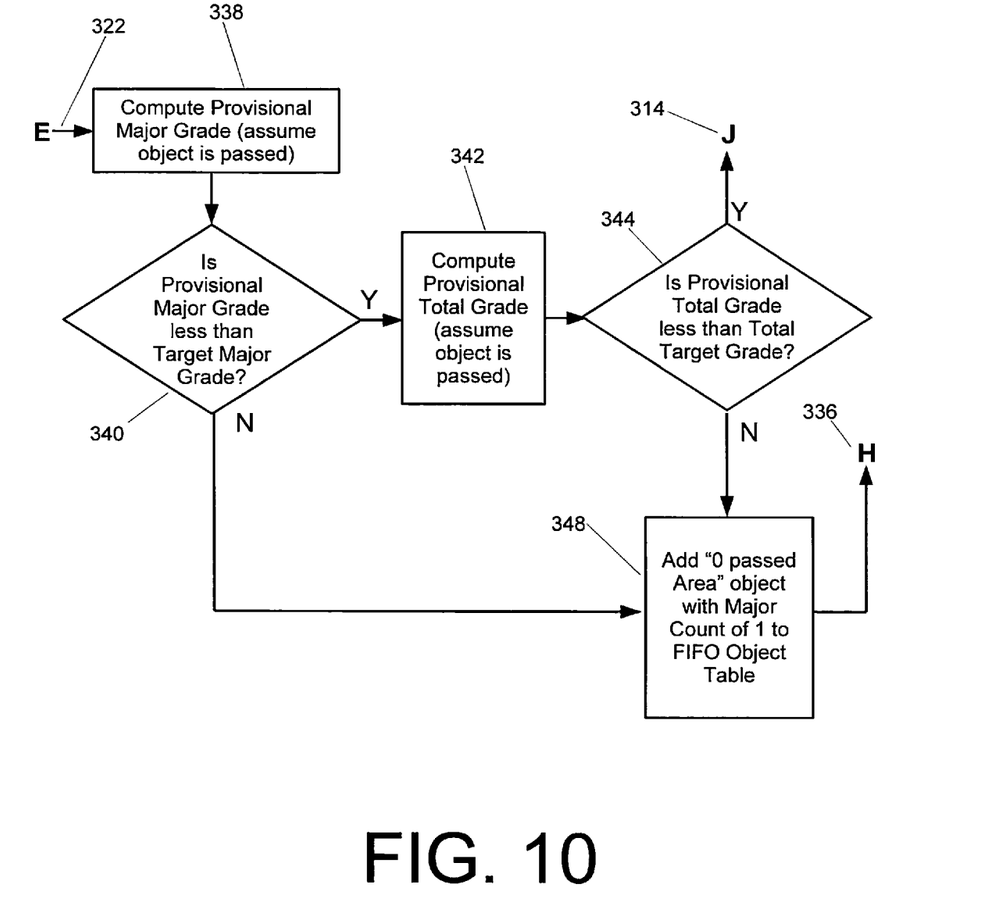
FIG. 10 is a simplified flow chart of steps followed for major objects.

If the provisional major grade is not less than or equal to the allowable major score or target major grade 204, meaning that its inclusion in the pass stream 80 would cause a level of quality in the pass stream 80 to be worse than the target quality level 88, then the original routing decision should stand and the object should be routed to the reject stream 76 which is outlined in the following steps. In this case, then, as shown in step 348, the current object is placed into the object sample table 154 in the current record 156 position as a zero passed area object with a major count of one. Following connector H designated by the number 336 directs us to step 356 where the values in the sample table summary 162 are adjusted to reflect the current contents of the object sample table 154. Following connector B 310 returns the process to step 300 in FIG. 7 where new objects are scanned and the process continues.

If the provisional major grade is less than the allowable major score or target major grade 204, as determined in step 340, then a provisional total grade is computed in step 342 in the grading regulator process 200.

The provisional total grade is the product of the majors passed count 182 from the sample table summary 162 plus one, representing the current object, plus a product of the viewing efficiency factor 210 for major objects provided by the model 206 by the major count 188 from sample table summary 162, multiplied by the severity points or weights 208 for major objects provided by the model 206 plus the product of the minors passed count 180 from the sample table summary 162, plus a product of the viewing efficiency factor 210 for minor objects provided by the model 206 by the minor count 186 from sample table summary 162, multiplied by the severity points or weights 208 for minor objects provided by the model 206. Then, in step 344, the provisional total grade value provided in step 342 is compared to the target grade 202.

If the provisional total grade is not less than or equal to the target grade 202, meaning that its inclusion in the pass stream 80 would cause a level of quality in the pass stream 80 to be worse than the target quality level 88, then the original routing decision should stand and the object should be routed to the reject stream 76 which is outlined in the following steps. In this case, then, as shown in step 348, the current object is placed into the object sample table 154 in the current record 156 position as a zero passed area object with a major count of one. Following connector H designated by the number 336 directs us to step 356 where the values in the sample table summary 162 are adjusted to reflect the current contents of the object sample table 154. Following connector B 310 returns the process to step 300 in FIG. 7 where new objects are scanned and the process continues.

Figure 12:
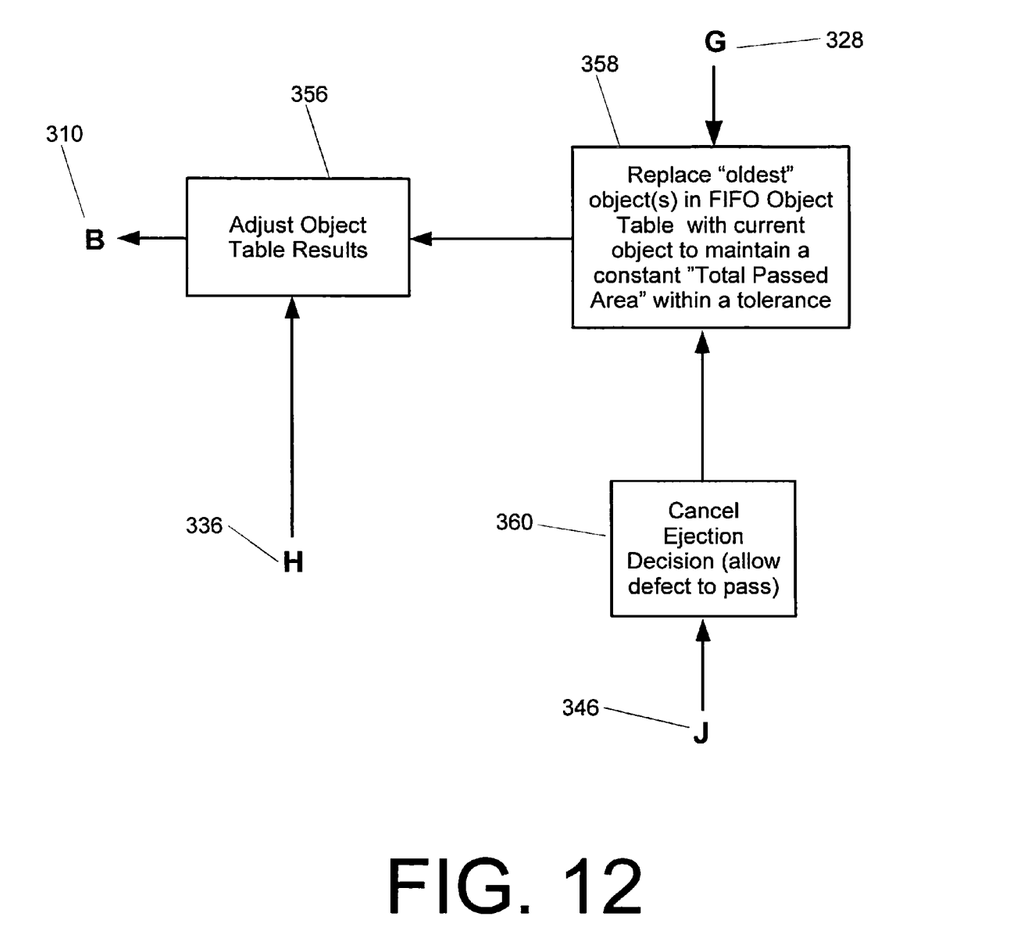
FIG. 12 is a simplified flow chart of steps followed to implement a quality decision and maintain a sample and summary of objects.

If the provisional total grade is less than or equal to the target grade 202, meaning that its inclusion in the pass stream 80 would maintain a level of quality in the pass stream 80 that is better than the target quality level 88, as ascertained in step 344, then following connector J designated by the numeral 346 to FIG. 12 to the step 360 where the grade regulator process 200 cancels the ejection decision originally provided by the view arbitrator process, and provides this information to the routing engine so that the ejector bank allows the major object 24 (FIG. 2) to proceed into the pass stream 80. Then, in the next step 358 the oldest included object record 158 is discarded to maintain a constant total passed area within a tolerance as maintained by the sample size control process 216 based on the sample size criteria 281 provided by the model 206. During this process it is sometime necessary to discard multiple objects in order to satisfy the sample size criteria 281. Next, in step 356 the values in the sample table summary 162 are adjusted to reflect the current contents of the object sample table 154. Following connector B 310 returns the process to step 300 in FIG. 7 where new objects are scanned and the process continues.

Referring again to FIG. 8, if the current object is not a major object as ascertained in step 320, then the current object is checked to see if it is a minor object in step 324. If it is a minor object 24 (FIG. 2), then following connector F designated by the numeral 326 forwards control to FIG. 11 where step 350 is taken that includes the task of computing the provisional total grade in the grade regulator process 200.

Figure 11:
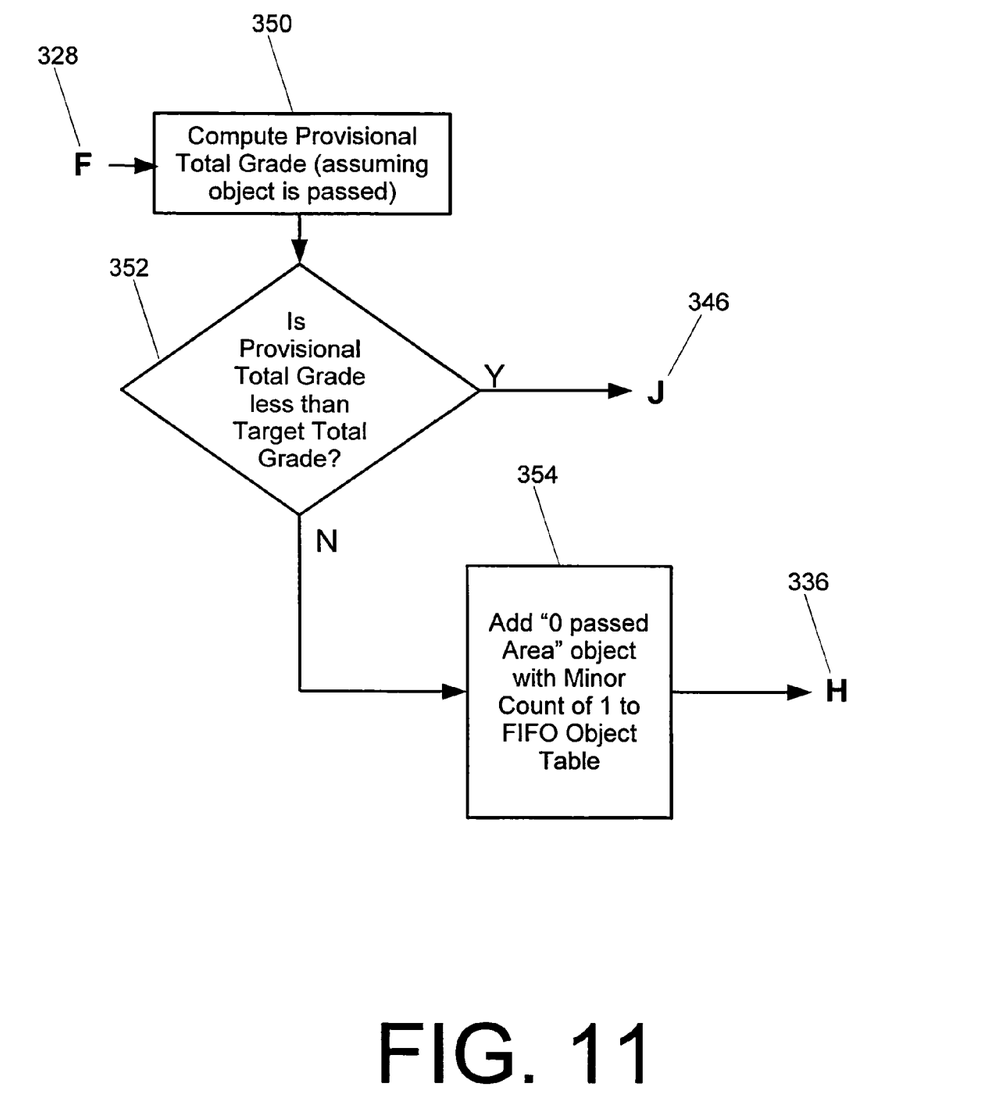
FIG. 11 is a simplified flow chart of steps followed for minor objects.

In this case, the provisional total grade is the product of the majors passed count 182 from the sample table summary 162, plus a product of the viewing efficiency factor 2'-0 for major objects provided by the model 206 by the major count 188 from sample table summary 162, multiplied by the severity points or weights 208 for major objects provided by the model 206 plus the product of the minors passed count 180 from the sample table summary 162 plus one, representing the current object, plus a product of the viewing efficiency factor 210 for minor objects provided by the model 206 by the minor count 186 from sample table summary 162, multiplied by the severity points or weights 208 for minor objects provided by the model 206.

Continuing on to step 352, if the provisional total grade is not less than or equal to the target grade 202, meaning that its inclusion in the pass stream 80 would cause a level of quality in the pass stream 80 to be worse than the target quality level 88, then the original routing decision should stand and the object should be routed to the reject stream 76 which is outlined in the following steps. In this case, then, as shown in step 354, the current object is placed into the object sample table 154 in the current record 156 position as a zero passed area object with a minor count of one. Following connector H designated by the number 336 directs us to step 356 where the values in the sample table summary 162 are adjusted to reflect the current contents of the object sample table 154. Following connector B 310 returns the process to step 300 in FIG. 7 where new objects are scanned and the process continues.

If the provisional total grade is less than or equal to the target grade 202, meaning that its inclusion in the pass stream 80 would maintain a level of quality in the pass stream 80 that is better than the target quality level 88, as ascertained in step 352, then following connector J designated by the numeral 346 to FIG. 12 to the step 360 where the grade regulator process 200 cancels the ejection decision originally provided by the view arbitrator process, and provides this information to the routing engine so that the ejector bank allows the minor object 24 (FIG. 2) to proceed into the pass stream 80. Then, in the next step 358 the oldest included object record 158 is discarded to maintain a constant total passed area within a tolerance as maintained by the sample size control process 216 based on the sample size criteria 281 provided by the model 206. During this process it is sometime necessary to discard multiple objects in order to satisfy the sample size criteria 281. Next, in step 356 the values in the sample table summary 162 are adjusted to reflect the current contents of the object sample table 154. Following connector B 310 returns the process to step 300 in FIG. 7 where new objects are scanned and the process continues.

Referring again to FIG. 8, if the current object is not a minor object as ascertained in step 324 then the object is presumably a good object 14 the connector G 328 guides us to FIG. 12 where the oldest included object record 158 is discarded to maintain a constant total passed area within a tolerance as maintained by the sample size control process 216 based on the sample size criteria 281 provided by the model 206. During this process it is sometime necessary to discard multiple objects in order to satisfy the sample size criteria 281. Next, in step 356 the values in the sample table summary 162 are adjusted to reflect the current contents of the object sample table 154. Following connector B 310 returns the process to step 300 in FIG. 7 where new objects are scanned and the process continues.

In compliance with the statute, the invention has been described in language more or less specific as to structural and methodical features. It is to be understood, however, that the invention is not limited to the specific features shown and describe, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A quality regulating apparatus configured to transform an incoming product stream of objects having an incoming quality level into a first output product stream having an outgoing quality level that follows a target quality level, and a second output product stream, comprising:
    a conveying device configured in transporting relation relative to the incoming product stream;
    a product stream sensor coupled to the incoming product stream as it is transported by the conveying device;
    an inspection engine connected to the product stream sensor and operable to categorize each object according to a criteria, and wherein objects are classified as desirable or as less desirable, and wherein the inspection engine comprises an estimator operable to measure an area of each object;
    a routing engine connected to the inspection engine, and which comprises an object sample table connected in data receiving relation to the inspection engine, and configured to maintain a recent sample of objects in a first-in-first out order;
    a sample table summary configured to reflect an amalgamation of values contained in the object sample table; and
    a grade regulator located in data communication relative to the sample table summary and operable to update object information in the object sample table and to modify an ejection signal before it is sent to the object diverting station;
    an object diverting station connected to the routing engine, and wherein the inspection engine and routing engine cooperate in a manner so that objects classified as less desirable are intentionally routed to the first output product stream when their inclusion maintains the outgoing quality level of the first output product stream at a level that is better than or equal to the target quality level, and wherein the grade regulator is operable to compute a provisional quality level of the first output product stream from a relationship that comprises an efficiency factor that is applied to a defective count summation stored in the sample table summary, and wherein the efficiency factor is a predefined value that accounts for objects that were classified as desirable when they properly should have been classified as less desirable.

2. The apparatus as claimed in claim 1, and wherein the object sample table includes a record for each object stored, and wherein each record contains a total area field, and a flag indicating a classification assignment for each object.

3. The apparatus as claimed in claim 1, and wherein objects that are classified as less desirable are specifically classified as critical, or major, or minor, and wherein the grade regulator is operable to compute a provisional quality level of the first output product stream from a relationship that comprises a weighting factor that is applied to a defective count summation stored in the sample table summary, and wherein the weighting factor is a predefined value that accounts for a severity of the specific classification assignment.

4. The apparatus as claimed in claim 3, and wherein the grade regulator is configured to instruct the routing engine so that less desirable objects classified as critical are routed to the second output product stream regardless of the quality level of the first output product stream.

5. The apparatus as claimed in claim 4, and wherein the grade regulator is operable to compute a provisional quality level of the first output product stream from a relationship that comprises an efficiency factor that is applied to a defective count summation of less desirable objects specifically classified and stored in the sample table summary, and wherein the efficiency factor is a predefined value for each specific classification assignment that compensates for objects that were classified as desirable when they properly should have been specifically classified as less desirable.

6. The apparatus as claimed in claim 4, and wherein the first output product stream has a second quality level approaching a second target quality level, and wherein the inspection engine and routing engine cooperate in a manner so that objects having a classification assignment as major are intentionally routed to the first output product stream when their inclusion maintains the second quality level of the first output product stream at a level that is better than or equal to the second target quality level.

7. The apparatus as claimed in claim 1, and wherein the estimator is further operable to identify objects that are clumped or clustered together in a spatial manner, and to provide a classification assignment for the cluster as a single object that represents the clumped objects.

8. A quality regulating method operable to transform an incoming product stream of objects into a first output product stream having a quality level approaching a target quality level and a second output product stream, comprising:
    scanning objects in the incoming product stream;
    classifying each object as a good object or a defective object;
    providing a second output product stream routing tag for defective objects;
    maintaining a collection of recent objects in an object table;
    computing a provisional quality level based on objects listed in the object table and on a current defective object by assuming that the current defect object is routed to the first output product stream;
    removing the second output product stream routing tag for the current defective object if the computed provisional quality level is better than or equal to the target quality level.

9. The quality regulating method as claimed in claim 8, further comprising:
    replacing a similar amount of first entered objects in the object table with the current defective object when the provisional quality level is better than or equal to the target quality level; and adding the current defective object as a zero passed area object to the object table when the provisional quality level is worse than the target quality level.

10. The quality regulating method as claimed in claim 9, and wherein the provisional quality level is computed by including a defect efficiency factor that accounts for objects that are incorrectly classified.

11. The quality regulating method as claimed in claim 9, further comprising:
    detecting and tagging an object that comprises a clump;
    removing a similar amount of first entered objects to an object tagged as a clump; and
    adding to the object table an object tagged as a clump in a first-in-first-out fashion, including an actual number of defects.

12. A quality regulating method operable to transform an incoming product stream of objects into a first output product stream having a quality level approaching a target quality level and a second output product stream, comprising:
- inspecting objects from the incoming product stream to provide inspection results;
- estimating the quality level of the first output stream for a sample of objects, and wherein estimating the quality level step comprises computing a provisional grade based on information measured from the sample of objects and on an efficiency model;
- evaluating the objects based on the inspection results and the quality level to provide a routing decision; and
- routing objects according to the routing decision, and wherein objects are evaluated and assigned a routing decision that urge them into the first output product stream when their inclusion would maintain the quality level so that it is maintained at a level that is equal to or better than the target quality level.

13. The quality regulating method as claimed in claim 12, and wherein the sample of objects are stored in a first-in-first-out table.

14. The quality regulating method as claimed in claim 13, and wherein the sample of objects is maintained at an approximate size that is specified by a model.

* * * * *